Dec. 20, 1949     C. LaDOW     2,491,739
FARM WASTE DISINTEGRATING MACHINE
Filed Dec. 11, 1944     2 Sheets-Sheet 1

INVENTOR
Chas. LaDow
ATTORNEYS

Patented Dec. 20, 1949

2,491,739

UNITED STATES PATENT OFFICE 2,491,739

FARM WASTE DISINTEGRATING MACHINE

Charles La Dow, Delano, Calif.

Application December 11, 1944, Serial No. 567,745

2 Claims. (Cl. 55—118)

This invention relates to a device for reducing and utilizing farm and orchard waste, such as grape vine and orchard cuttings and field vines and the like.

The main objective of the invention is to utilize these waste materials for conditioning of the soil instead of merely gathering them in piles and destroying them by burning as is now the general practice. My invention may therefore properly be termed the "soil builder" in that it operates upon such waste material and prepares it for return to and incorporation with the soil where it acts as a mulch, fertilizer, and a general soil conditioner and builder.

Another primary objective of the invention is to provide a machine which will travel through orchards, vineyards and field crops generally gathering up as it goes the waste materials of the character indicated and feeding them to a device which will very positively comminute and pulverize same to a very fine degree and distribute and spread the comminuted material evenly over the ground surface, whereupon it will be incorporated with the soil during the cultivating of the latter. It is, of course, a known fact that a mulch of this kind tends to make the soil more friable and also to add certain chemical elements thereto, tending to enhance the productivity thereof.

These objects are accomplished by means of such structure and relative arrangement of parts as will fully appear by a perusal of the following specification and claims.

In the drawings similar characters of reference indicate corresponding parts in the several views:

Figure 4 is a diagrammatic plan of the driving mechanism connected at the end of a tractor and arranged to drive my comminuting unit.

Figure 1:
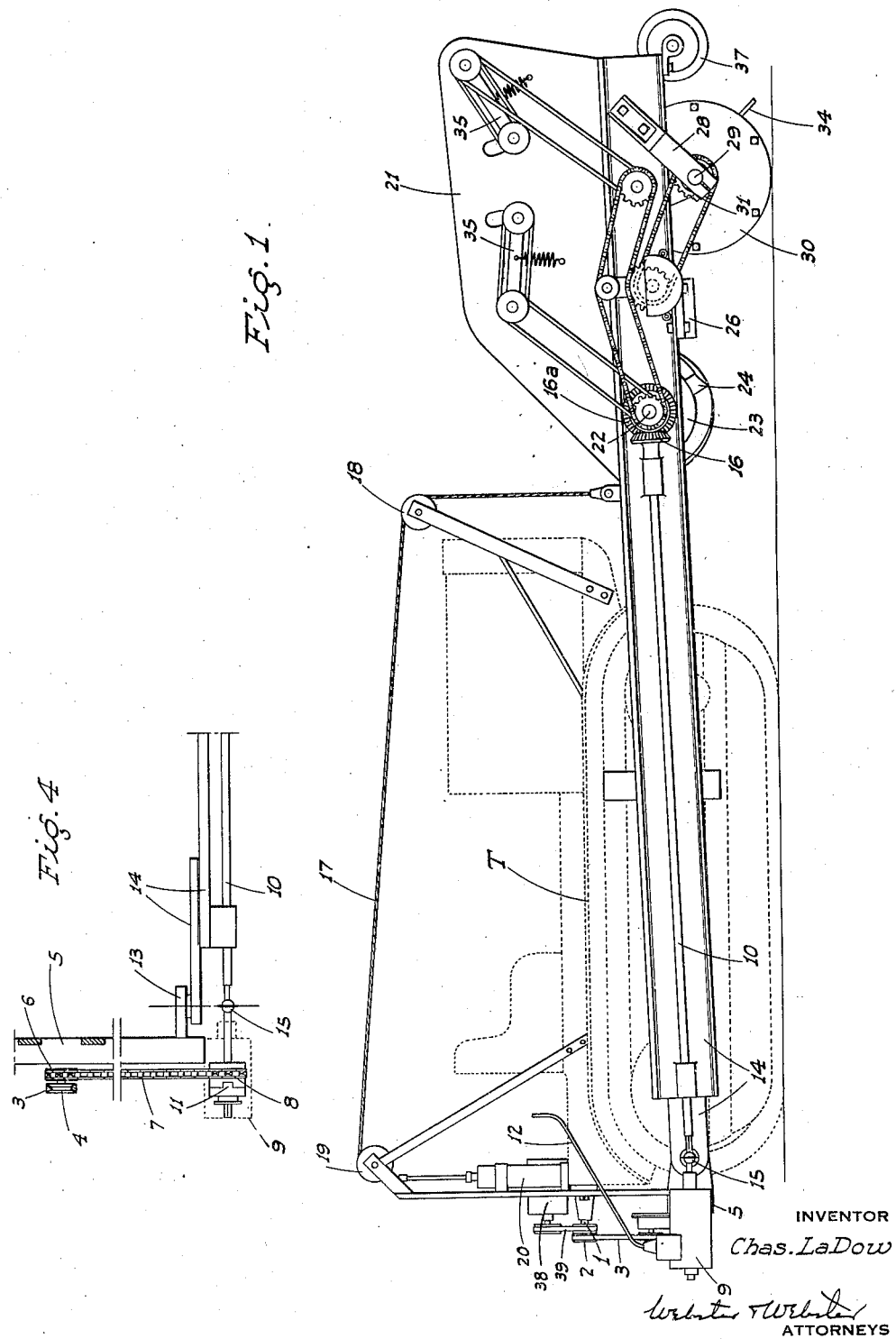
Figure 1 is a side elevation of my improved machine.
Figure 2:
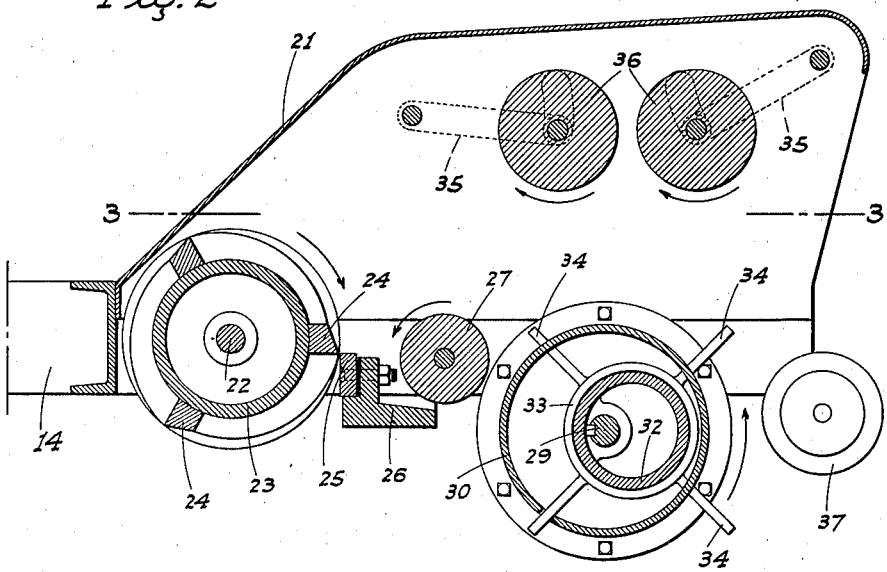
Figure 2 is an enlarged sectional elevation of the gathering and comminuting unit per se.
Figure 3:
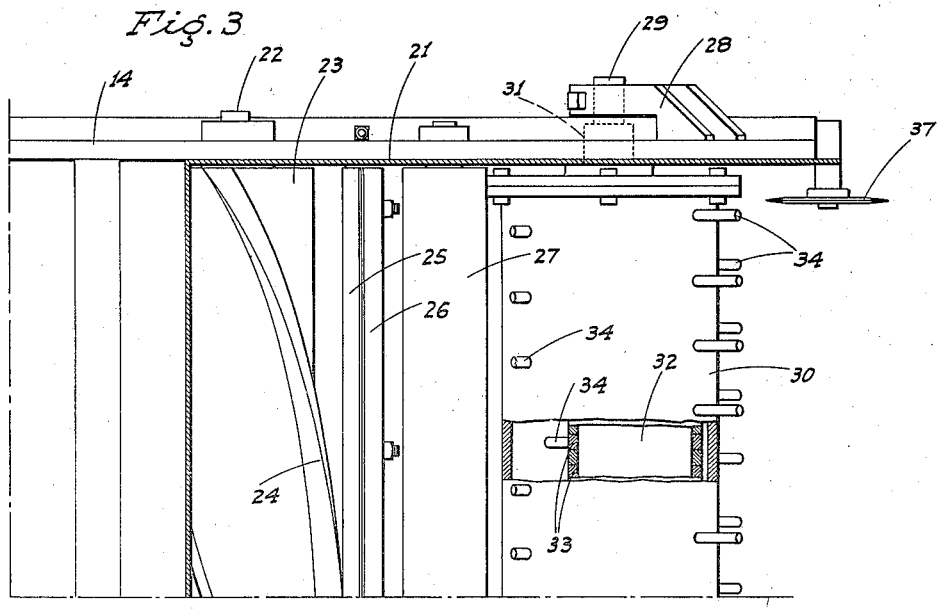
Figure 3 is a fragmentary sectional plan on a line 3—3 of Fig. 2.

Referring now more particularly to the characters of reference on the drawings, the device is intended for use on any type of farm tractor, and in the drawing Fig. 1 shows it as it would appear when attached to a crawler type tractor as that, for instance, of the type shown in dotted lines and designated by the letter "T."

In a tractor of this character there is what is called a power take-off shaft 1. In applying my device I provide on this shaft a pulley 2 which drives a belt 3. This belt 3 in turn drives another pulley 4 on a shaft suitably journalled on a beam 5 which I attach to the rear of the tractor frame in any suitable manner. This shaft 4 in turn drives a pinion 6 connected by a chain 7 with another pinion 8 in a transmission housing 9. The pinion 8 is rotatably mounted on a shaft 10 having a make and break clutch 11 thereon, which clutch may be thrown into and out of engagement with the pinion 8 through the medium of a clutch lever 12 extending to a point adjacent the seat of the tractor.

On the frame 5 I provide projecting flanges 13, one on each side of the tractor. Pivotally mounted on these flanges 13 are two supporting beams 14 which extend alongside the tractor and project to a considerable distance ahead of the tractor as shown in Fig. 1 and which beams ride against wear plates mounted on the tractor.

The shaft 10 is journalled in one of these beams 14 and is provided with a ball and socket joint 15 in line with the pivotal connection between the beam and flange 13 to allow of the up and down swinging movement of the shaft with the beam.

At the outer end of the shaft 10 is provided a bevel gear 16 which drives a pinion 16a which in turn is connected in driving relation with the several driven elements of my comminuting unit as will be presently described.

Connected to the beams 14 just ahead of the tractor is a cable 17 which extends over pulleys 18 and 19 supported above the tractor by suitable brackets and which cable may be shortened or lengthened through the medium of any power control unit of conventional type such as a hydraulic jack 20 or a cable drum as may be selected. The operation of the cable determines the position of the pick-up reel of the comminuting unit in a manner as will be apparent.

Over the outer ends of the beams 14 I preferably dispose a covering hood 21 within the cover of which my pick-up and comminuting mechanism is disposed.

The shaft 22 on which is fastened the pinion 16a extends between the beams 14. On this shaft is mounted a drum 23 about which are spiral cutting blades 24. These blades 24 are adapted to co-act with a cutter bar 25 detachably mounted in a cross frame 26. The cutter bar 25 is removable for the purpose of repair and substitution as the same may wear in use.

Just ahead of the cutter bar 25 is disposed a roller 27 adapted to revolve toward the cutter bar 25 as indicated by the arrow.

On the forward ends of the beams 14 are secured clamping bars 28 which project slightly below the forward ends of the beams and support a fixed shaft 29. A drum 30 is positioned between the forward ends of the beams 14 and has journals 31 rotatably mounted on the shaft 29. Within the drum 30 is a sleeve 32 which is fixed in eccentric relation on the shaft 29. Rotatable about the sleeve 32 is another sleeve 33 provided with a plurality of extending pick-up fingers 34 which fingers project through the periphery of the drum 30.

It will be obvious that with the rotation of the drum 30 the sleeve 33 is carried about the sleeve 32 with an eccentric motion. This will first project the pick-up fingers through the drum 30 as they approach the ground level. At this point they will pick up any waste material on the ground and carry it upwardly to a point above the drum and within the housing 21. The fingers 34 will then withdraw from the material. Accumulated material in the housing will have been pushed over the roller 27. The action of this roller will advance such material to the co-acting cutters 24 and 25, the action of which will comminute such material and drop it back upon the ground.

In order to make sure of the progress of the material to the comminutor in the manner above stated, I provide one or more spring-pulled arms 35 just above the drum 30 and spaced therefrom and on the ends of these arms I provide rollers 36 adapted to rotate in a direction shown by the arrows which will tend to force the material from the drum toward the roller 27 and cutter blades 24 and 25.

The spiral cutting blades, the drum, and the several rollers are all power driven from the master gear 16a by any conventional driving connections, the details of which it is deemed unnecessary to describe, one conventional form being indicated in Fig. 1. However, the particular arrangement of the driving means may be changed at will, and hence forms no essential part of my invention.

At the forward end of the beams 14 are cutting colters 37 which will divide the material so that only a proper quantity will carry into the hood 22.

An oil pump 38 may be driven from shaft 1 by a belt 39 or similar drive connection therebetween as indicated in Fig. 1. However, this specific arrangement, together with the specific drive between shaft 1 and shaft 10, are obviously capable of change as the type of tractor to which the device is applied may necessitate, without affecting the spirit of the invention.

From the foregoing description the operation of the device will be quite clear and it will be obvious that I have produced a mechanism which can readily pick up any and all kinds of waste material from the ground and finally comminute it and return it into the ground as a soil builder.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A device for the purpose described comprising a vehicle supported frame, a housing on the frame, a comminutor mounted on the frame within the housing, a pick up reel mounted on the frame in spaced relation ahead of the comminutor, the pick up reel including retractable pick up fingers operable with the rotation of the reel to project from the reel body and pick up material from the ground immediately below the housing and carry it directly into the housing and to then withdraw from such material, a roller disposed between the comminutor and the reel in a position closely adjacent both of such elements, such roller functioning to advance to the comminutor the material delivered into the housing by the reel, power means to drive the comminutor, reel and roller, and a draft roller mounted in the housing in spaced relation to the reel above the latter and cooperating with the first roller in the advancement of the material to the comminutor.

2. A device for the gathering and reduction of farm and orchard waste, comprising a vehicle mounted supporting frame, a housing mounted on the frame, a comminutor mounted on the frame within the housing, a pick up reel mounted on the frame in spaced relation ahead of the comminutor and below the housing whereby material picked up by the reel will be delivered directly into the housing, a pair of rollers in the housing immediately above and spaced from the pick up reel, a roller mounted in the frame between the pick up reel and the comminutor, and power means connected in driving relation with the rollers and pick up reel and operative to rotate the lower faces of the pair of rollers and the upper faces of the other roller and the pick up reel in a direction toward the comminutor.

CHARLES LA DOW.

REFERENCES CITED

The following references are of record in the file of this patent:

UNITED STATES PATENTS

| Number | Name | Date |
| --- | --- | --- |
| 714,475 | Gray | Nov. 25, 1902 |
| 1,457,424 | Bunch | June 5, 1923 |
| 1,923,405 | Wickersham | Aug. 22, 1933 |
| 2,240,066 | Bingham | Apr. 29, 1941 |
| 2,345,715 | Reed | Apr. 4, 1944 |
| 2,347,907 | Hill | May 2, 1944 |